United States Patent [19]

Wickham

[11] 3,883,188
[45] May 13, 1975

[54] EMPTY/LOAD CONTROL VALVE APPARATUS
[75] Inventor: David John Wickham, London, England
[73] Assignee: Westinghouse Brake & Signal Co. Ltd., Chippenham, Wiltshire, England
[22] Filed: Jan. 24, 1974
[21] Appl. No.: 436,393

[30] Foreign Application Priority Data
Feb. 16, 1973 United Kingdom................. 7635/73

[52] U.S. Cl.............................................. 303/23 R
[51] Int. Cl............................................... B60t 8/20
[58] Field of Search...... 303/22 A, 22 R, 23 A, 23 R

[56] References Cited
UNITED STATES PATENTS
2,039,710    5/1936    Dean................................. 303/23 R
3,671,086    6/1972    Scott................................. 303/23 R Primary Examiner—Duane A. Reger
Attorney, Agent, or Firm—Larson, Taylor & Hinds

[57] ABSTRACT

An empty-load valve for brake equipment in which empty and load sensing is effected by a device which relays an auxiliary reservoir fluid pressure to control a biassed valve by which a volume which is extra to brake-cylinder volume is connected thereto for "empty" conditions and disconnected therefrom for "load" conditions and the pressure in the extra volume is effective by virtue of a differential area device to close a cutoff valve such as to thereafter isolate the extra volume from a triple valve which controls the brake cylinder pressure.

7 Claims, 1 Drawing Figure

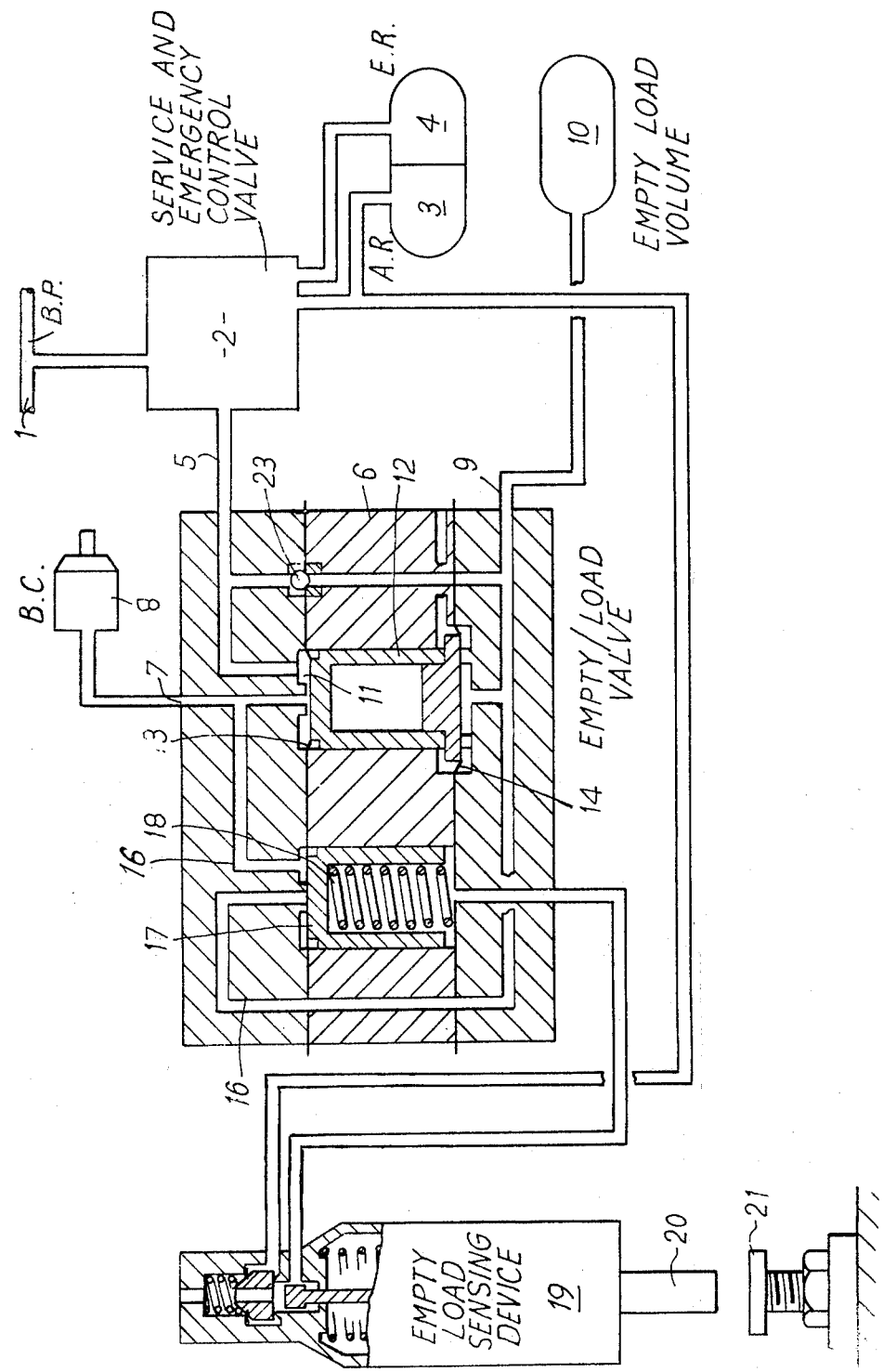

EMPTY/LOAD CONTROL VALVE APPARATUS

This invention relates to empty/load control valve apparatus for braking systems and relates especially but not exclusively to such apparatus for use in conjunction with a control valve for adjusting a brake pressure corresponding to a given change of brake pipe pressure from a release pressure in accordance with vehicle loading.

According to the present invention there is provided an empty/load fluid pressure control valve apparatus including a brake pressure input port, a brake cylinder pressure output port and a port for connection to an extra volume, cut off valve means connected between the brake pressure input port and the brake cylinder output port and operable by a differential pressure responsive means responsive in operation to the pressure of the extra volume port predominating over the brake pressure at the input port to close the cut-off valve, a further valve controlled by fluid pressure applied from an empty-load sensing device to hold closed a communication which otherwise is provided between the brake cylinder output port and the extra volume port for a loaded condition.

Said communication is preferably via a biassed valve which is unseatable by brake cylinder output port pressure in the empty condition.

Said biassed valve is preferably a spring-biassed piston valve.

Where the brake cylinder pressure is derived from a control valve operating in dependence upon the difference of pressure between a brake cylinder and an auxiliary reservoir to relay auxiliary reservoir pressure to a brake cylinder via the empty-load control pressure may be auxiliary reservoir pressure relayed via the empty-load sensing device.

In order to facilitate release of fluid pressure from the extra volume, a check valve may be provided between the brake pressure input port and the extra volume port which allows flow of fluid pressure from the extra volume port to the brake pressure input port when the pressure at the latter is lower than the pressure at the former.

In order that the invention may be more clearly understood and readily carried into effect, the same will be further described by way of example with reference to the accompanying drawing which illustrates in schematic form, a brake system utilising an empty-load control valve apparatus in accordance with the invention.

Referring to the drawing, the braking apparatus which is shown is controlled by the pressure in a brake pipe 1 which is connected to a control valve denoted by the block reference 2 which has an associated auxiliary reservoir 3 and an emergency reservoir 4. The output pressure from the control valve is applied to a brake pressure input port 5 of an empty-load fluid pressure control valve having a main body 6. The empty-load control valve governs in dependence upon vehicle loading, the pressure which appears at a brake cylinder output port 7 and which is applied to a brake cylinder 8. The empty-load control valve has an extra volume port 9 which is connected to an extra volume 10 which as will be seen hereafter shares the brake cylinder air under empty conditions. A check valve 23 is provided between the above mentioned ports 5 and 9 which, as will be seen, only allows fluid flow between 9 and 5 on release of the brake.

The empty-load valve includes a cut-off valve 11 which is controlled by the differential pressures across a plunger 12 between a pair of diaphragms 13 and 14. The cut-off valve 11 is included in a path between the brake pressure input port 5 and the brake cylinder output port 7. A passage 16 is provided between the brake cylinder output port 7 and the underside of the diaphragm 14 via a further valve 17 which is biassed to a normally closed condition by a bias spring 18. The valve 17 is a piston valve and is deflectable against the spring bias afforded by 18 by a sufficient pressure being present in the path 16. The underside of the piston valve 17 is connected via an empty-load sensing device 19 to the auxiliary reservoir 3. The empty-load sensing device 19 is mounted on a sprung part of the vehicle and has a plunger 20 and an associated adjustable abutment 21 which is mounted on an unsprung part of the vehicle. The parts 20 and 21 abut in a loaded condition of the vehicle and the mechanism of 19 is such that in the unloaded condition, the communication between the underside of the piston valve 17 and the auxiliary reservoir is disconnected from the auxiliary reservoir and connected to atmosphere. The details of the empty-load sensing device form no part of the present invention.

Before referring to the manner of operation of the empty-load control valve apparatus, a brief description of the control valve of block 2 will be given. This consists essentially of a service control portion which is basically a triple valve controlled by a reduction of brake pipe pressure in relation to auxiliary reservoir pressure, to relay auxiliary reservoir pressure to the brake cylinder. When a sufficient amount of auxiliary reservoir air has been relayed to the brake cylinder, the triple valve laps into a stable lap condition and the brake pressure is thus determined by the drop of brake pipe pressure. The control valve of the block 2 is also assumed to include an emergency portion which, if the brake pipe pressure is allowed to be reduced at more than a certain rate, an additional amount of air is discharged from the emergency reservoir 4 into the brake cylinder to achieve an emergency braking application. Apparatus of the general type of block 2 is described in British Pat. Specification No. 1302930 or 1306708.

In operation of the empty-load control valve apparatus, assuming that the vehicle carrying the apparatus is sufficiently loaded to abut the abutment 21 and connect the underside of the piston valve 17 to the auxiliary reservoir 3, the bias which is inherent in the baissed further valve 17 by virtue of the spring 18, is supplemented by the auxiliary reservoir pressure. A brake application made by the control valve apparatus 2 produces a brake pressure at the brake input port 5 and this is applied above the diaphragm 13 of the valve 11. The body 12 of this valve is thus deflected downwards to its lowermost position allowing pressure in the port 5 to flow past the seat of the valve 11 into the passage 16 upstream of valve 17 and also via the brake cylinder output port 7 to the brake cylinder 8. Owing to the auxiliary reservoir pressure under the piston valve 17, the valve 17 remains seated and no air flows beyond valve 17 in the passage 16. Pressure above the diaphragm of the piston valve 17 can never exceed the pressure below. When in certain circumstances both pressures are equal, the spring 18 ensures that the valve 17 remains closed. For a full service application, auxiliary reservoir and brake cylinder pressure equalise in a conventional manner. The check valve 23 prevents brake cylinder air flowing into the passage connected to the extra volume port 9. A release of the brake cylinder pressure, is effected also in a conventional manner by an increase of brake pipe pressure causing the triple valve of the apparatus of block 2 to move to a release position and the brake cylinder is vented through the brake cylinder exhaust valve of the triple valve apparatus via the ports 7 and 5 of the empty-load control valve.

In an emergency application, the empty-load control valve operates in a similar manner to that described above, the brake cylinder pressure rising to a higher value being an equalisation pressure with the auxiliary reservoir 3 together with the emergency reservoir 4.

Referring now to operation of the apparatus in the empty condition, the load sensing device 19 rises to lift the plunger 20 clear of the abutment 21 and the auxiliary reservoir 3 is isolated from the underside of the baissed further valve 17, which underside is also now connected to atmosphere by the load sensing device 19. A brake pressure appearing at the brake pressure input port 5 now again downwardly deflects the valve body 12 and flows past the valve 11 into the passage 16 upstream of valve 17 and to the brake cylinder via the brake cylinder output port 7. The pressure is again applied above the further biassed valve piston and the valve 17 remains closed due to the upward bias of the spring 18 acting thereon. The initial rise in brake cylinder pressure up to a pressure of say 9lbs per square inch is therefore at the same rate as in the loaded condition of the apparatus. At the said value, the spring bias afforded by 18 is overcome by the pressure on the piston valve 17 and a flow of air now passes to the underside of the diaphragm 14. It is observed that this air can also pass via the extra volume port 9 to the extra volume 10. The brake cylinder pressure therefore remains at the value set by the bias spring 18 for a short interval during the charging of the extra volume 10 to the same pressure. Further brake cylinder pressure developed in the control valve 2 charges both the brake cylinder 8 and the extra volume 10. This continues until the auxiliary reservoir pressure has fallen to its normal equalisation value and at this point the pressure in the brake cylinder and the extra volume which is now substantially less than the normal equalisation pressure due to the increased volume, is acting on the underside of the diaphragm 14. The diaphragm 13 is of smaller area than the diaphragm 14 and therefore sufficient upward force is exerted on the body 12 to close off the cut-off valve 11. The pressure in the brake pressure input port can thus charge to what is a normal equalisation pressure under loading conditions.

In an emergency application, the same sequence of events takes place on application with the exception that the pressures involved are proportionally higher due to the additional air which is provided by the emergency reservoir 4.

In moving to a release condition, when the pressure in the brake pipe 1 is recovered, to effect a release, the pressure at the brake pressure input port 5 is vented via the valve 2 and the pressure which exists under the diaphragm 14 continues to maintain the valve 11 closed. However pressure in the brake cylinder is vented via the passage 16, the further valve 17 and the check valve 23 to the brake pressure input port and the control valve 2. At a certain pressure, in the passage 16, the spring 18 overcomes the pressure above the further valve 17 and the valve 17 is closed. The brake cylinder 8 and the passages connected thereto then become isolated for a brief interval until the pressure under the diaphragm 14 has leaked away via the check valve 23 sufficiently to be overcome by the remaining pressure above the diaphragm 13 and if necessary a light spring. At this point the body 12 moves down to its lowermost position and the brake cylinder 8 is vented via the port 7, the valve 11, the port 5 and the control valve 2.

In the empty condition, an initial rapid filling of the brake cylinder is provided up to a predetermined value by the presence of the spring 18 and a function similar to inshot is thereby provided.

While not described in the above description, it will be appreciated that the load sensing device 19 may be provided with a lost motion arrangement whereby it is rendered insensitive to running spring deflections on the vehicle such that the apparatus does not intermittently hunt between empty and load conditions.

Having thus described our invention what we claim is:

1. An empty-load fluid pressure control valve apparatus including a brake pressure input port, a brake cylinder pressure output port and a port for connection to an extra volume, cut-off valve means connected between the brake pressure input port and the brake cylinder output port and operable by a differential pressure responsive means responsive in operation to the pressure of the extra volume port predominating over the brake pressure at the input port to close the cut off valve, a further valve controlled by fluid pressure applied from an empty-load sensing device to hold closed a communication which otherwise is provided between the brake cylinder output port and the extra volume port for a loaded condition.

2. An empty-load control valve as claimed in claim 1, wherein said further valve is a biassed valve which is unseatable in the empty condition by brake cylinder output pressure.

3. An empty-load control valve as claimed in claim 2, wherein said biassed valve is a piston valve biassed by a spring.

4. An empty-load control valve as claimed in claim 1, said brake pressure input port being connected for its source of pressure to a triple valve which operates in response to the difference of pressure between a brake pipe and an auxiliary reservoir and the control pressure from the load sensing device being derived from the auxiliary reservoir.

5. An empty-load control valve as claimed in claim 4, a check valve being provided in a further communication between the brake pressure input port and the extra volume which in brake releasing operation permits fluid flow between the extra volume and the brake pressure input port other than via said further valve.

6. Apparatus as claimed in claim 1, including a check valve in a further communication between the brake pressure input port and the extra volume which in brake releasing operation permits fluid flow between the extra volume and the brake pressure input port other than via said further valve.

7. Apparatus as claimed in claim 1, wherein said further valve is a biased valve which is unseatable in the empty condition by brake cylinder output pressure, said biased valve comprising a piston valve biased by a spring, said pressure input port being connected for its source of pressure to a triple valve which operates in response to the difference of pressure between a brake pipe and an auxiliary reservoir, the control pressure from the load sensing device being derived from the auxiliary reservoir, and a check valve being provided in a further communication between the brake pressure input port and the extra volume which in brake releasing operation permits fluid flow between the extra volume and the brake pressure input port other than via said further valve.

* * * * *